United States Patent [19]
Antonevich

[11] 3,830,098
[45] Aug. 20, 1974

[54] OUTPUT MONITORED ELECTROMECHANICAL DEVICES

[75] Inventor: John N. Antonevich, Jamestown, N.Y.

[73] Assignee: Blackstone Corporation, Jamestown, N.Y.

[22] Filed: Mar. 22, 1973

[21] Appl. No.: 343,847

[52] U.S. Cl. .............................................. 73/67.2
[51] Int. Cl. ............................................ G01n 29/00
[58] Field of Search ........ 73/67.2, 70, 71.2, 71.5 U, 73/71.4, 67, 67.1

[56] References Cited
UNITED STATES PATENTS

| | | | |
|---|---|---|---|
| 3,108,469 | 10/1963 | Dyer et al. | 73/67.1 |
| 3,251,009 | 5/1966 | Hunter | 73/71.2 X |

*Primary Examiner*—Jerry W. Myracle
*Attorney, Agent, or Firm*—Buell, Blenko & Ziesenheim

[57] ABSTRACT

An electromechanical device comprises a pair of like transducer units affixed to a bar having with the transducers natural frequencies of vibration so that one unit is nearer a node than the other. An impedance is connected in series with each transducer unit, and the two series circuits are paralleled. The difference current through the two impedances is directly proportioned to the displacement of the vibrating bar, both at its mechanical resonance frequency and at its mechanical plus electrical anti-resonance frequency.

10 Claims, 5 Drawing Figures

OUTPUT MONITORED ELECTROMECHANICAL DEVICES

This invention relates to electromechanical transducers. It is more particularly concerned with transducer apparatus arranged to provide an indication of the transducer motion or displacement at or near its natural frequencies of vibration.

Electromechanical transducers are used in ultrasonic inspection and for other purposes in industry. As its name applies, an electromechanical transducer converts electrical energy into mechanical motion, or viceversa. Such a transducer has a fundamental mechanical resonant frequency, that is, a natural frequency of vibration at which its displacement, or motion, has maximum amplitude. If it is used to convert electrical energy into mechanical motion, its efficiency will be high when its driving electrical energy is supplied at an electrical frequency corresponding to its mechanical resonant frequency. When transducers are used in parallel pairs, as is sometimes the case, the pair also has a natural antiresonant frequency determined by its mechanical and electrical constants. Its efficiency is high at this frequency also. It is, therefore, conventional to match the electrical frequency of the supply with the natural frequency of the transducer as well as can be done.

A prime difficulty in this respect is that the transducer load influences its natural frequency, that is to say the resonant frequency is the resonant frequency of the loaded transducer. This can vary from the resonant frequency of the unloaded transducer, depending not only on the nature of the load but also on the tightness of coupling between transducer and load. In many applications, the resonant frequency of the loaded transducer will be known only approximately. Measurement of the electrical currents to or from the transducer does not provide a proportional indication of displacement because the graph of current against frequency does not coincide with the graph of displacement against frequency. This happens because transducers are not purely resistive devices, but have reactive components. The conventional practice has been to measure mechanical motion by auxiliary transducers used as pickups. These, especially capacitive or reluctance pickups, are coupled loosely to the transducer being measured so as to minimize their effect on its natural resonant frequency. Their use, however, complicates operations and is time-consuming.

It is an object of my invention, therefore, to provide a transducer arrangement which can be readily monitored in the neighborhood of resonance so as to determine its displacement. It is another object to provide such a transducer arrangement which will furnish an electrical indicator of its displacement. Other objects of my invention will appear in the following description thereof.

I realize the objects above set out by providing an unbalanced, paired electromechanical transducer with means for measuring the difference between the currents to or from the two units. I find this difference current to be proportional to the amplitude of motion, or displacement, of the composite transducer. I determine this current by providing a pair of impedances, one in series with each transducer unit, and measuring the voltage across the two junctions between impedance and transducer unit.

Embodiments of my invention presently preferred by me are shown schematically in the attached figures, to which reference is now made.

Figure 1:
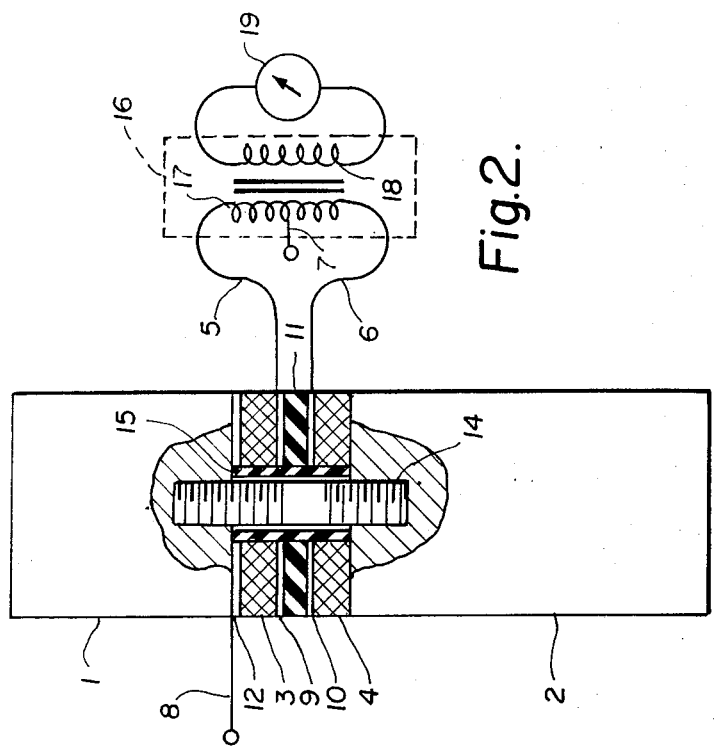
FIG. 1 is a schematic of a first preferred embodiment of my invention using a pair of piezoelectric transducer units in series with resistive impedances.

In the embodiment of FIG. 1 a pair of identical piezoelectric transducer units 3 and 4 spaced from each other by insulating element 11 is positioned between the ends of prismatic bar elements 1 and 2. The assembly is firmly cemented together. The length of bar element 2 is greater than the length of bar element 1, but the bar elements 1 and 2 are otherwise identical and are made of the same elastic material. Piezoelectric unit 3 is provided with an electrode 12 on its surface abutting bar unit 1, an electrode 9 on its opposite surface abutting insulating element 11, and is polarized across its thickness, that is, between electrodes 9 and 12. Piezoelectric unit 4 is likewise provided with an electrode 13 on its surface abutting bar element 2, an electrode 10 on its opposite surface abutting insulating element 11, and is polarized across its thickness between electrodes 10 and 13. Electrodes 12 and 13 are connected to terminal 8. Electrode 9 is connected by conductor 5 to one end of resistor 20. Electrode 10 is connected by conductor 6 to one end of resistor 21. The connections are made so that piezoelectric units 3 and 4 oppose each other. The other ends of resistors 20 and 21 are connected to terminal 7. A voltmeter 22 is connected between conductor 5 and conductor 6.

My apparatus above described is put into operation by applying a driving alternating current voltage to terminals 7 and 8. It is evident that the mechanical motions imparted to the arrangement by the piezoelectric units 3 and 4 will oppose each other. If the prismatic bar elements 1 and 2 were of the same length, the resistors 20 and 21 of the same value and the piezoelectric units 3 and 4 were identical, the arrangement of FIG. 1 would be an electromechanical Wheatstone bridge balanced for all frequencies and the voltmeter 22 would read zero. However, as has been mentioned, prismatic bar elements 1 and 2 are of different lengths. For any frequency of input current in the neighborhood of resonance frequency one of the piezoelectric units 3 or 4 will be better coupled than the other, because nearer a mechanical node than the other, and will draw more current than the other. Thus, the current through resistor 20 will not be the same as the current through resistor 21 and voltmeter 22 will read a voltage proportional to the difference of the two input currents. I find that this voltage or current difference is proportional to the displacement, or the amplitude of vibrations of the composite unit.

Figure 4:
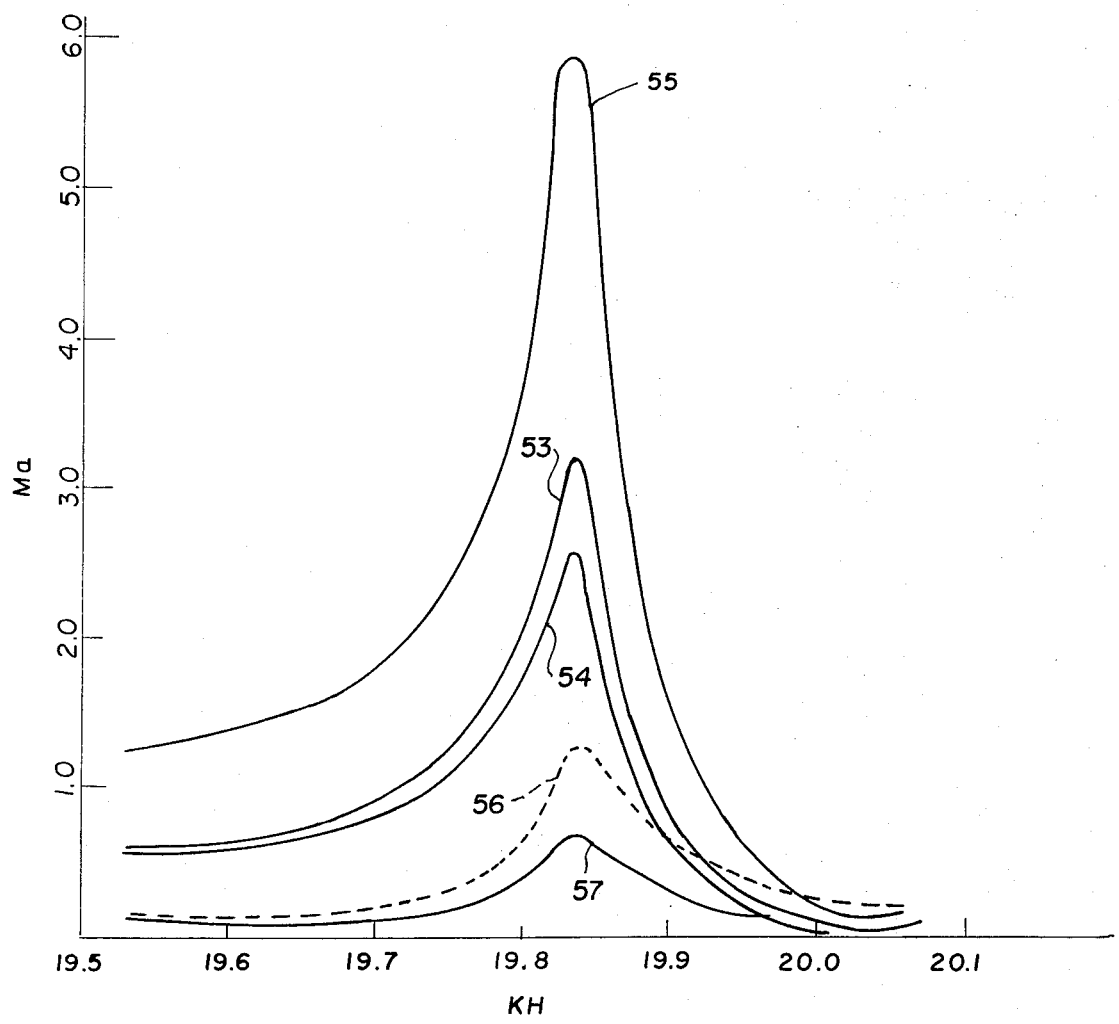
FIG. 4 is a set of curves showing the relation between transducer currents and displacement of my transducer at its frequency of resonance.

FIG. 4 illustrates the relation between currents and displacement in the neighborhood of its mechanical resonance for the transducer of FIG. 1 in which insulating element 11 separating piezoelectric units 3 and 4 is positioned 0.06 wavelengths from a displacement node. The amplitude of the applied voltage is held constant but its frequency is varied about the mechanical resonant frequency of the transducer, which is 19.845 kilohertz. The abscissa of the graph is frequency in kilohertz and the ordinate is current or displacement, as the case may be. Curve 53 is the current to one piezoelectric unit and curve 54 is the current to the other unit. Curve 55 is the sum of the currents to the piezoelectric units. Curve 56 represents the amplitude of motion or displacement of the free end of the transducer bar. Curve 57 is the difference between the currents to the two piezoelectric units. This current is in phase with the voltage applied to terminals 7 and 8. It is evident that the shape of this curve approximates that of curve 56 much more closely than the shape of curve 53, 54 or curve 55. Those curves rise more slowly and decline faster than curve 56 as the frequency is increased through resonance frequency. The difference current, plotted as curve 57, is proportional to the displacement plotted as curve 56.

The fundamental mechanical frequency of my apparatus illustrated in FIG. 1 is near that having a wavelength twice the overall length of the apparatus. As the dissipation of the mechanical system is low, its resonant frequency is quite sharply marked and the reading of the voltmeter 22 is zero or nearly that until the supply frequency is adjusted to be quite close to resonance. The sensitivity of my apparatus depends upon the relative positions of piezoelectric units 3 and 4 with respect to the points of minimum and maximum amplitude of motion of the prismatic bar, in other words, its nodes and loops. Maximum sensitivity is achieved when one such element is at a node and the other is at a loop. It is not necessary to operate my apparatus at its fundamental resonance frequency. Satisfactory results are obtained when it is operated at a harmonic thereof, in which case the nodes and loops are found much closer together on the bar.

In the foregoing description I have assumed that the piezoelectric units 3 and 4 are identical and that resistors 20 and 21 are of the same value. In practice the electrical capacitance across piezoelectric unit 3 between electrodes 9 and 12 will not necessarily be identical with the capacitance between electrodes 12 and 13. I therefore adjust the relative values of resistors 20 and 21 to balance the clamped capacitances above mentioned. This balance is independent of frequency.

Figure 2:
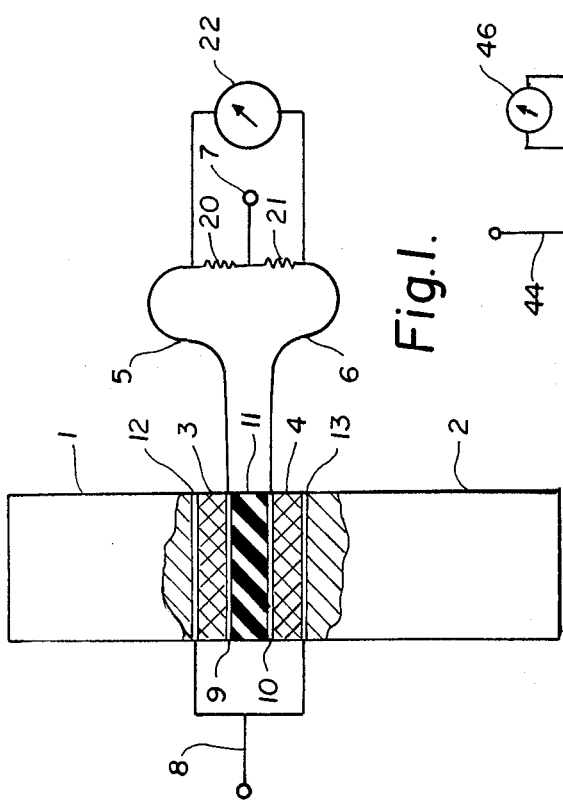
FIG. 2 is a schematic of a second preferred embodiment of my invention using a pair of piezoelectric transducer units in series with inductive impedances.

FIG. 2 illustrates an embodiment of my invention suitable for high power. In this embodiment the elements which are identical with the elements of FIG. 1 carry the same reference characters. Again a pair of piezoelectric transducer units 3 and 4 spaced from each other by insulating element 11 is positioned between the ends of prismatic bar elements 1 and 2. The bar elements 1 and 2 are mechanically connected by a threaded stud 14 so as to prestress piezoelectric transducer units 3 and 4. Electrode 12 positioned between bar element 1 and piezoelectric unit 3 is held in contact with bar element 1 by stud 14, which also connects it electrically with bar element 2 and the face of piezoelectric unit 4 adjacent thereto. Stud 14 is insulated electrically from electrodes 9 and 10 by insulating sleeve 15. Electrodes 9 and 10 are connected by conductors 5 and 6 respectively to the outer ends of an inductance 17 forming the primary winding of a transformer 16. A terminal 7 is brought out from the center of winding 17. The secondary winding 18 of transformer 16 is connected to volt meter 19.

In operation, a driving alternating current voltage is applied to terminals 7 and 8. The operation of the apparatus is the same as that of FIG. 1 except that it is the difference of the currents through the two sections of primary winding 17 of transformer 16 which is read by meter 19. The relative position of terminal 7 with respect to winding 17 is adjusted to balance the clamped capacitances of piezoelectric transducer units 3 and 4.

Figure 3:
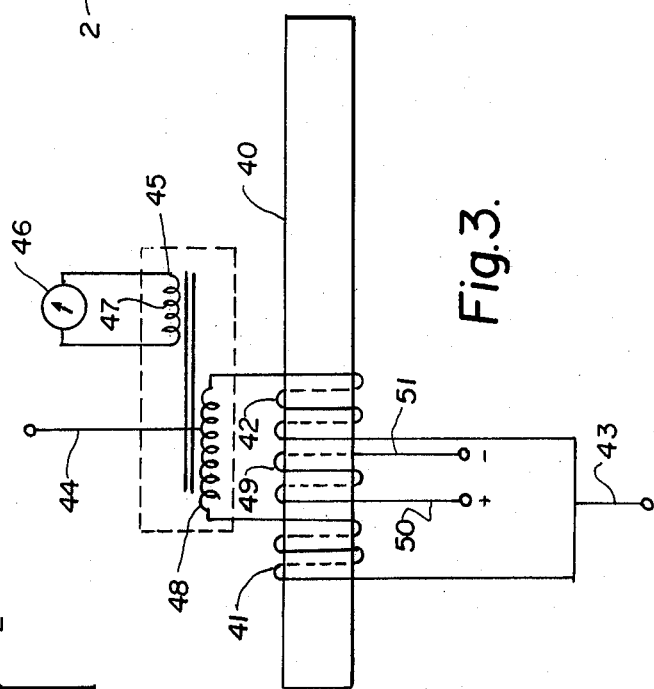
FIG. 3 is a schematic of a third preferred embodiment of my invention using a dual unit magnetostrictive transducer in series with inductive impedances.

The embodiment of my invention illustrated in FIG. 3 makes use of a unitary prismatic bar 40 of magnetostrictive material. Primary coil 49 wound around bar 40 and brought out to terminals 50 and 51 is a magnetizing coil. Identical coils 41 and 42 wound in the same direction on either side of magnetizing coil 49 are pickup coils and with bar 40 constitute the pair of transducer units. The leading end of each coil 41 and 42 is connected to terminal 43. Between the other end of each coil 41 and 42 is connected primary winding 48 of a transformer 45. The approximate center point of winding 48 is brought out to tap 44. The secondary winding 47 of transformer 45 is connected to meter 46. The capacitances of bar 40 to coils 41 and 42 are balanced as before by adjusting the position of tap 44 on winding 48.

The apparatus is put into operation by applying a direct current voltage to terminals 50 and 51 to magnetize the bar 40 and an alternating current voltage to terminals 43 and 44. The fundamental resonant frequency of the apparatus is that of bar 40 and the driving voltage applied to terminals 43 and 44 is adjusted approximately to that value. In this arrangement if coils 41 and 43 are symmetrically located with respect to a node or a loop of bar 40, the difference current flowing through primary winding 48 will show a minimum, and its maximum value will occur when coils 41 and 42 are adjusted so that one is at a node and the other at a loop of bar 40. The difference current again is proportional to amplitude of vibrations, and I adjust the driving voltage frequency to produce a maximum reading of meter 46.

Figure 5:
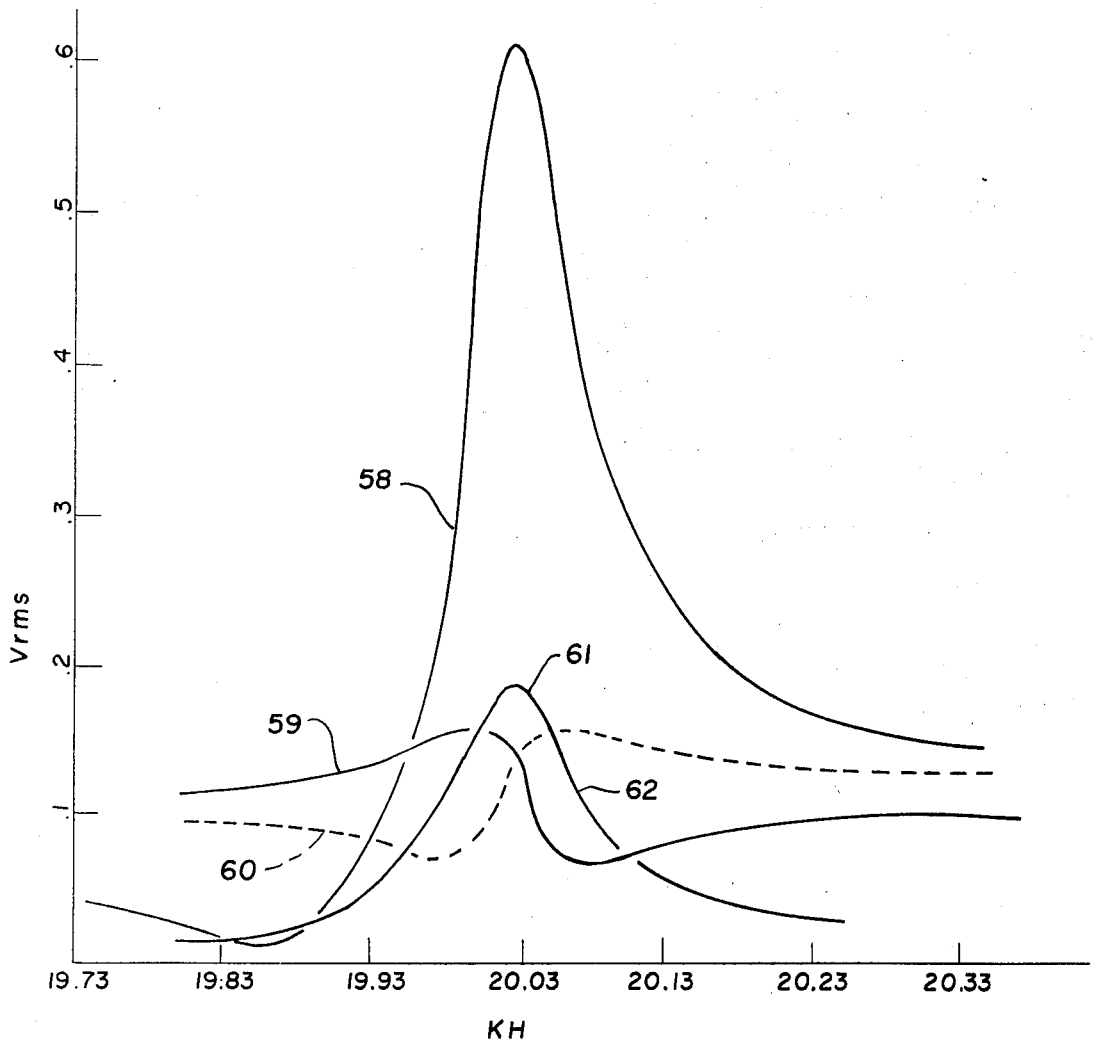
FIG. 5 is a set of curves showing the relation between transducer currents and displacement of my transducer at its anti-resonant frequency.

The discussion above of the operation of my invention has been confined to conditions at or near the mechanical resonant frequency of the apparatus. However, my apparatus, which has been described, is equally effective in producing a signal proportional to mechanical displacement at the anti-resonant frequency of the transducer previously described. FIG. 5 illustrates the relation between currents and displacement at the frequency of anti-resonance of my transducer of FIG. 1. Here the amplitude of the aggregate current or the sum of the currents to the piezoelectric units was held constant. Curve 58 is the curve of the voltage across terminals 7 and 8. Curve 59 is the current through one piezoelectric unit and curve 60 is the current through the other unit. These currents are out of phase as the unit nearer the node of the bar in FIGS. 1 and 2 has an equivalent inductive reactance while the other unit has a capacitive reactance. Curve 61 is the curve of the difference between the currents of curves 59 and 60, and coincides with the curve 62 of the displacement of the free end of the transducer bar.

In the description of my preferred embodiments I have referred to bar elements 1 and 2 as being prismatic and identical except in length, and to bar element 40 as being prismatic. My invention is not, however, so limited. The bar elements may be of any cross-section. Differential coupling of the transducer units may be obtained not only by differences in length of otherwise identical bar elements but by differences in density, cross-section or modulus of elasticity of the bar elements, or by combinations of those properties.

While I have described the apparatus of my invention as it is used to convert electrical energy into mechanical motion, those skilled in the art will understand that the difference current from the transducer units likewise serves as an index of displacement when my apparatus is used to convert mechanical motion into electrical energy.

In the foregoing specification I have described a presently preferred embodiment of this invention, however, it will be understood that this invention can be otherwise embodied within the scope of the following claims.

I claim:

1. An electromechanical transducer comprising a bar having a natural frequency of vibration in its longitudinal mode, a pair of like two terminal electrically driven means for imparting vibration thereto affixed to the bar, the first of such means being positioned nearer to a node on the bar than the second, a first input terminal connected to one terminal of each electrically driven means, a second input terminal connected with the other terminal of each electrically driven means, the electrically driven means being connected to as to oppose each other, and means for measuring the difference between the currents flowing in the electrically driven means.

2. Apparatus of claim 1 in which the bar is a prismatic bar.

3. Apparatus of claim 1 in which the bar is a bar of magnetostrictive material and the electrically driven means are coils of wire surrounding the bar.

4. Apparatus of claim 1 in which the electrically driven means are piezoelectric units.

5. Apparatus of claim 1 including a first impedance in series with the second input terminal and the first electrically driven means, and a second impedance in series with the second input terminal and the second electrically driven means, and in which the means for measuring the difference between the currents flowing in the electrically driven means comprise means connected for measuring the voltage across the junctions of the electrically driven means and the impedances.

6. Apparatus of claim 5 including means for adjusting the relative magnitudes of the series impedances.

7. Apparatus of claim 5 in which each series impedance is a resistor.

8. Apparatus of claim 5 in which each series impedance is an inductance.

9. Apparatus of claim 5 in which the series impedances are the primary of a transformer and the means for measuring the voltage are connected to the secondary of that transformer.

10. Apparatus of claim 5 in which the electrically driven means are piezoelectric units and in which the series impedances are adjusted to balance the clamped capacitances of the piezoelectric units.

* * * * *